(12) United States Patent
Song et al.

(10) Patent No.: US 11,434,395 B2
(45) Date of Patent: Sep. 6, 2022

(54) SINGLE-SIDED PRESSURE-SENSITIVE ADHESIVE TAPE

(71) Applicant: ROGERS CORPORATION

(72) Inventors: Jinsoo Song, Anyang (KR); Dongjin Lee, Suwon (KR); Dongwoo Han, Seoul (KR)

(73) Assignee: ROGERS CORPORATION, Chandler, AZ (US)

( * ) Notice: Subject to any disclaimer, the term of this patent is extended or adjusted under 35 U.S.C. 154(b) by 286 days.

(21) Appl. No.: 16/713,538

(22) Filed: Dec. 13, 2019

(65) Prior Publication Data

US 2020/0199412 A1 Jun. 25, 2020

Related U.S. Application Data

(60) Provisional application No. 62/783,323, filed on Dec. 21, 2018.

(51) Int. Cl.
*C09J 7/29* (2018.01)
*C09J 7/38* (2018.01)
(Continued)

(52) U.S. Cl.
CPC . *C09J 7/29* (2018.01); *C09J 5/00* (2013.01); *C09J 7/22* (2018.01); *C09J 7/255* (2018.01);
(Continued)

(58) Field of Classification Search
CPC ......... C09J 7/29; C09J 5/00; C09J 7/22; C09J 7/255; C09J 7/385; C09J 11/04; C09J 2203/318; C09J 2301/40; C09J 2301/41; C09J 2400/163; C09J 2433/00; C09J 2433/006; C09J 2467/00; C09J 2475/00; C09J 2400/226; C09J 2467/006; C09J 2475/006; C09J 2483/00; C09J 7/20; C09J 7/38; C09J 7/40; C09J 7/50; C09J 2203/00; C09J 2400/10; C09J 2400/16; C09J 2400/22; C09J 7/30; C09J 201/00; C09J 2301/312; G02B 6/0086; G02B 6/0088;
(Continued)

(56) References Cited

U.S. PATENT DOCUMENTS 8,673,443 B2  3/2014 Yokoyama et al.
2004/0028895 A1  2/2004 Yamakami et al.
(Continued)

FOREIGN PATENT DOCUMENTS

CN    202808683 U    3/2013
CN    208532675 U    2/2019
(Continued)

*Primary Examiner* — Patricia L. Nordmeyer
(74) *Attorney, Agent, or Firm* — Cantor Colburn LLP

(57) ABSTRACT

A single-sided pressure-sensitive adhesive tape includes a substrate, a reflective metal layer disposed on a surface of the substrate, a pressure-sensitive adhesive layer disposed on the reflective metal layer, a thermoplastic polymer layer, and a light-shielding layer disposed on a surface of the thermoplastic polymer layer; wherein the light-shielding layer is dry laminated to the surface of the substrate opposite the surface on which the reflective metal layer is disposed. Articles comprising the tape, and methods of making and using the tape are disclosed.

18 Claims, 1 Drawing Sheet

(51) Int. Cl.
*C09J 5/00* (2006.01)
*C09J 11/04* (2006.01)
*C09J 7/22* (2018.01)
*C09J 7/25* (2018.01)
*F21V 8/00* (2006.01)

(52) U.S. Cl.
CPC .............. *C09J 7/385* (2018.01); *C09J 11/04* (2013.01); *G02B 6/0086* (2013.01); *C09J 2203/318* (2013.01); *C09J 2301/40* (2020.08); *C09J 2301/41* (2020.08); *C09J 2400/163* (2013.01); *C09J 2433/00* (2013.01); *C09J 2433/006* (2013.01); *C09J 2467/00* (2013.01); *C09J 2475/00* (2013.01); *Y10T 428/14* (2015.01)

(58) Field of Classification Search
CPC .. G02B 6/0055; G02B 6/0065; G02B 6/0013; Y10T 428/14; B32B 7/06; B32B 27/10; B32B 2255/205; B32B 2255/26; B32B 2270/00; B32B 2307/416; B32B 7/12; B32B 27/08; B32B 27/18; B32B 27/20; B32B 27/22; B32B 27/281; B32B 27/285; B32B 27/286; B32B 27/288; B32B 27/302; B32B 27/304; B32B 27/306; B32B 27/32; B32B 27/325; B32B 27/34; B32B 27/36; B32B 27/365; B32B 27/40; B32B 2255/10; B32B 2255/28; B32B 2307/4023; B32B 2307/54; B32B 2307/71; B32B 2307/732; B32B 2307/748; B32B 2405/00; B32B 2457/202; B32B 2311/24; B32B 2313/04; G02F 1/1336

See application file for complete search history.

(56) References Cited

U.S. PATENT DOCUMENTS

| 2005/0163995 | A1 | 7/2005 | Yokoyama et al. |
| 2008/0311369 | A1* | 12/2008 | Yokoyama ................ B32B 7/12 428/354 |
| 2010/0021668 | A1* | 1/2010 | Shimokawa ................ C09J 5/06 428/40.2 |

FOREIGN PATENT DOCUMENTS

| JP | 200424449 A | 9/2004 |
| JP | 2007084830 A | 4/2007 |
| KR | 101170023 B1 | 8/2012 |
| KR | 101563245 B1 | 10/2015 |
| WO | 2010106999 A1 | 9/2010 |
| WO | 2017109927 A1 | 6/2017 |

* cited by examiner

SINGLE-SIDED PRESSURE-SENSITIVE ADHESIVE TAPE

CROSS-REFERENCE TO RELATED APPLICATIONS

This application claims priority to U.S. Application Ser. No. 62/783,323 filed on Dec. 21, 2018, which is incorporated herein by reference in its entirety.

BACKGROUND

This disclosure relates to a single-sided pressure-sensitive adhesive tape, methods for making and using the single-sided pressure-sensitive adhesive tape, and articles comprising the single-sided pressure-sensitive adhesive tape.

Liquid crystal displays (LCDs) are used in a variety of devices, including consumer electronic devices, such as computer monitors, cell phones, and LCD televisions. The width of the bezel around the liquid crystal display (LCD) of many consumer electronic devices has been getting narrower for both functional reasons and visual aesthetics. However, as the bezel narrows, light leakage from the edge of the display becomes more of a problem. Although various approaches have been tried to minimize the amount of light leakage, none has been completely successful.

Further, in the past, the light guide panel (LGP) of LCDs was fixed within a rigid frame, and then attached to the LCD panel. However, with low- and no-bezel displays, and a desire for increasingly thinner devices, manufacturers have been moving away from rigid frames to alternative means of framing the LGP, such as adhesive tapes, which permit an overall thinner device design.

Several properties are important for tapes to be used to frame LGPs. Light shielding performance of a tape determines the ability of the tape to minimize light leakage. Reflection performance of a tape determines the ability of the tape to improve brightness of the LCD. Additionally, for television displays, it would be particularly advantageous for a tape acting as a light guide frame substrate to have a high surface energy for bonding to a foam tape binding the LGP to the LCD panel, without requiring any pre-treatment of the framing tape, as is required for frames made of low surface energy polycarbonate.

BRIEF SUMMARY

Disclosed herein is a single-sided pressure-sensitive adhesive tape and methods of making and using the tape.

A single-sided pressure-sensitive adhesive tape includes a substrate, a reflective metal layer disposed on a surface of the substrate, a pressure-sensitive adhesive layer disposed on the reflective metal layer, a thermoplastic polymer layer, and a light-shielding layer disposed on a surface of the thermoplastic polymer layer; wherein the light-shielding layer is dry laminated to the surface of the substrate opposite the surface on which the reflective metal layer is disposed.

Articles comprising the tape are disclosed.

A method of manufacturing a light guide panel for a liquid crystal display includes adhering the single-sided pressure-sensitive adhesive tape to at least a portion of the perimeter of a light guide panel to form a frame.

The above described and other features are exemplified by the following figures, detailed description, and claims.

BRIEF DESCRIPTION OF THE DRAWINGS

The following is a brief description of the drawings, which are presented for the purpose of illustrating the exemplary embodiments disclosed herein and not for the purpose of limiting the same. Like elements are numbered alike in the accompanying Figures.

DETAILED DESCRIPTION

The inventors hereof have developed a single-sided pressure-sensitive adhesive tape having excellent light shielding and reflection performance. The tape further advantageously possesses high surface energy. These characteristics make the single-sided pressure-sensitive adhesive tape especially suitable for use in framing light guide panels of low- or no-bezel liquid crystal displays.

The single-sided pressure-sensitive adhesive tape comprises a substrate, a reflective metal layer disposed on a surface of the substrate, a pressure-sensitive adhesive layer disposed on the reflective metal layer, a thermoplastic polymer layer, and a light-shielding layer disposed on a surface of the thermoplastic polymer layer; wherein the light-shielding layer is dry laminated to the surface of the substrate opposite the surface on which the reflective metal layer is disposed.

The single-sided pressure-sensitive adhesive tape has a reflectance of 80% or higher (from 80 to 100%) on a selected surface, preferably 85% or higher, and more preferably, 90% or higher, as determined at 550 nm by the method described in Example 1. The single-sided pressure-sensitive adhesive tape also has a transmittance of 0.1% or lower, more preferably 0.05% or lower, as determined at 550 nm by the method described in Example 1.

Figure 1:
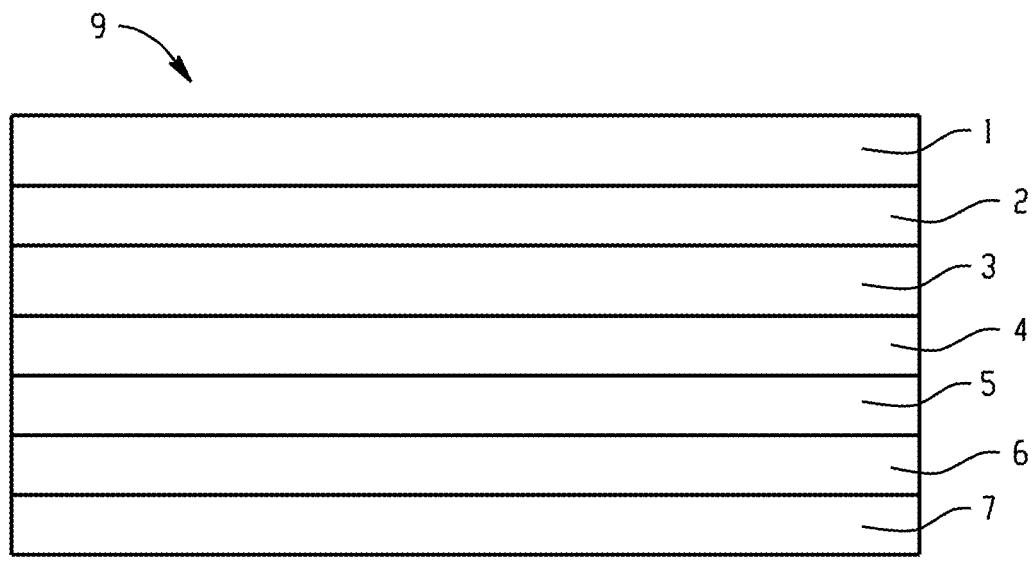
FIG. 1 is a cross-sectional illustration of an embodiment of a single-sided pressure-sensitive adhesive tape 9 with seven layers as follows: 1: thermoplastic polymeric film; 2: light-shielding layer; 3: dry-lamination layer; 4: substrate; 5: reflective metal layer; 6: pressure-sensitive adhesive layer; 7: removable release layer.

FIG. 1 is a cross-sectional illustration of an exemplary single-sided pressure-sensitive adhesive tape 9 comprising thermoplastic polymer layer 1, light shielding layer 2, dry-lamination layer 3, substrate 4, reflective metal layer 5, pressure-sensitive adhesive layer 6, and removable release layer 7. It is to be understood that in all of the embodiments described herein, the various layers can fully or partially cover each other. It is also understood that the various layers can be in direct physical contact with neighboring layers (directly on) or any intervening layer can be present, for example an adhesive layer.

While the tape 9 of FIG. 1 depicts each of the individual layers 1 to 7 having certain visual dimensions with respect to itself and in relation to another layer, it will be appreciated that this is for illustration purposes only and is not intended to limit the scope of the invention disclosed herein. Each layer of tape 9 has a thickness appropriate to provide the desired characteristics to the tape 9.

The composition of substrate 4 is selected to provide the tape with good tensile strength. Examples of polymeric materials suitable for the substrate include a polyester (such as polyethylene terephthalate, polyethylene naphthalate, polybutylene terephthalate, or polybutylene naphthalate), a polyolefin (such as polyethylene, polypropylene, or an ethylene-propylene copolymer), polyvinyl alcohol, polyvinylidene chloride, polyvinyl chloride, a vinyl chloride-vinyl acetate copolymer, polyvinyl acetate, a polyamide, a polyimide, a cellulose, a fluorinated resin, a polyether, a polystyrene resin (such as polystyrene), polycarbonate, polyethersulfone, and combinations of the foregoing polymers. In some embodiments, the substrate comprises polyethylene terephthalate, polyethylene naphthalate, polymethyl methacrylate, or a combination thereof. More preferably the substrate can comprise polyethylene terephthalate.

The thickness of the substrate is not particularly limited. The substrate thickness can be, for example, in the range of 1 to 150 µm, preferably in the range of 2 to 100 µm, and more preferably in the range of 4 to 75 µm.

The substrate material may further contain an additive, as needed to achieve desired properties. Examples of additives include a filler, a flame retardant, an antiaging agent, an antistatic, a softener, an ultraviolet absorber, an antioxidant, a plasticizer, a surfactant, and a combination thereof.

The substrate may be formed by any suitable method. For example, the substrate can be formed by casting the selected polymer composition as a film or by molding a resin composition constituting the selected polymeric material into a sheet by a molding method such as extrusion molding, injection molding, or calendar molding.

The reflective metal layer disposed on the substrate can be aluminum, silver, copper, platinum, nickel, or a combination thereof. The reflective metal layer can be deposited on the substrate to a thickness of 0.5 nanometer (nm) to 200 nm, 1 nm to 100 nm, 2 nm to 75 nm, 2.5 to 50 nm, or 3 to 40 nm by any suitable method. For example, the metal can be deposited by physical vapor deposition, chemical vapor deposition, or a combination thereof. Physical vapor deposition methods include electron beam evaporation, sputtering, thermal evaporation, and the like.

The reflective metal layer has a reflectance capable of providing a reflectance of 80% or higher on a selected surface of the single-sided pressure-sensitive adhesive tape. Therefore, the reflectance of the reflective layer itself is 80% or higher (from 80 to 100%), preferably 85% or higher and more preferably, 90% or higher.

The type and thickness of the pressure-sensitive adhesive (PSA) disposed on the reflective metal layer is selected to provide the tape with suitable levels of adhesiveness and removability for the desired use of the tape. In one application, the adhesive layer requires sufficient adhesiveness so that the tape can be attached to the perimeter of a light guide panel. The thickness of the adhesive layer can be, for example, 10 to 150 micrometer (µm), 20 to 100 µm, or 25 to 80 µm.

Examples of pressure-sensitive adhesives include an acrylic pressure-sensitive adhesive, a rubber pressure-sensitive adhesive, a urethane pressure-sensitive adhesive, a silicone pressure-sensitive adhesive, a polyester type pressure-sensitive adhesive, a polyamide pressure-sensitive adhesive, an epoxy pressure-sensitive adhesive, a vinyl alkyl ether pressure-sensitive adhesive, a fluorinated pressure-sensitive adhesive, and a combination thereof. In some embodiments, the PSA comprises an acrylic pressure-sensitive adhesive, a rubber pressure-sensitive adhesive, a urethane pressure-sensitive adhesive, a silicone pressure-sensitive adhesive, or a combination thereof.

The acrylic pressure-sensitive adhesive contains an acrylic polymer as the principal component or base polymer. The acrylic polymer is not particularly restricted, but preferably employs a (meth)acrylic acid alkyl ester (acrylic acid alkyl ester or methacrylic acid alkyl ester) as a principally constituting monomer component (principal monomer component). Specific examples of the (meth)acrylic acid alkyl ester include methyl (meth)acrylate, ethyl (meth)acrylate, propyl (meth)acrylate, isopropyl (meth)acrylate, butyl (meth)acrylate, isobutyl (meth)acrylate, s-butyl (meth)acrylate, t-butyl (meth)acrylate, pentyl (meth)acrylate, isoamyl (meth)acrylate, neopentyl (meth)acrylate, hexyl (meth)acrylate, heptyl (meth)acrylate, 2-ethylhexyl (meth)acrylate, octyl (meth)acrylate, isooctyl (meth)acrylate, nonyl (meth)acrylate, isononyl (meth)acrylate, decyl (meth)acrylate, isodecyl (meth)acrylate, undecyl (meth)acrylate, and dodecyl (meth)acrylate. The (meth)acrylic acid alkyl ester may be employed singly or in a combination thereof.

Regarding the monomer components constituting the acrylic polymer, as long as a (meth)acrylic acid alkyl ester is employed as the principal monomer component, another monomer component capable of copolymerizing with (meth)acrylic acid alkyl ester (also called "copolymerizable monomer component") may also be used. The (meth)acrylic acid alkyl ester is preferably employed in a proportion of 50 wt % or higher, with respect to all the monomer components constituting the acrylic polymer. When the amount of the (meth)acrylic acid alkyl ester is less than 50 wt % with respect to all the monomer components constituting the acrylic polymer, it may be difficult to exhibit the characteristics (such as pressure-sensitive adhesive property) of the acrylic polymer.

The copolymerizable monomer component may be used for introducing a crosslinking site into the acrylic polymer or for improving the cohesive power of the acrylic polymer. The copolymerizable monomer component may be employed singly or in a combination of two or more different copolymerizable monomer components.

For example, for the purpose of introducing a crosslinking site into the acrylic polymer, a functional group-containing monomer component (particularly a thermally crosslinking functional group-containing monomer component for introducing a thermal crosslinking site into the acrylic polymer) can be employed. Such functional group-containing monomer component may be, without particular restriction, any monomer component that can copolymerize with (meth)acrylic acid alkyl ester and that has a functional group providing a crosslinking site, and examples thereof include carboxyl group-containing monomers such as (meth)acrylic acid, itaconic acid, crotonic acid, maleic acid, fumaric acid, and isocrotonic acid, and anhydride thereof (such as maleic anhydride and itaconic anhydride); hydroxyl group-containing monomers such as hydroxyalkyl (meth)acrylates such as 2-hydroxyethyl (meth)acrylate, 2-hydroxypropyl (meth)acrylate, and 2-hydroxybutyl (meth)acrylate, vinyl alcohol and allyl alcohol; amide type monomers such as (meth)acrylamide, N,N-dimethyl(meth)acrylamide, N-butyl(meth)acrylamide, N-methylol (meth)acrylamide, N-methylolpropane (meth)acrylamide, N-methoxymethyl (meth)acrylamide, and N-butoxymethyl (meth)acrylamide; amino group-containing monomers such as aminoethyl (meth)acrylate, N,N-dimethylaminoethyl (meth)acrylate, and t-butylaminoethyl (meth)acrylate; epoxy group-containing monomers such as glycidyl (meth)acrylate, and methylglycidyl (meth)acrylate; cyano group-containing monomers such as acrylonitrile and methacrylonitrile; and monomers having a nitrogen-containing ring, such as N-vinyl-2-pyrrolidone, N-methylvinylpyrrolidone, N-vinylpyridine, N-vinylpiperidone, N-vinylpyrimidine, N-vinylpiperazine, N-vinylpyrazine, N-vinylpyrrole, N-vinylimidazole, N-vinyloxazole, N-vinylmorpholine, N-vinylcaprolactam, and N-(meth)

acryloylmorpholine. As the functional group-containing monomer, a carboxyl group-containing monomer such as acrylic acid or an acid anhydride thereof can be employed advantageously.

Also, another copolymerizable monomer component may be employed for the purpose of increasing the cohesive power of the acrylic polymer. Examples of such another copolymerizable monomer component include vinyl ester type monomers such as vinyl acetate and vinyl propionate; styrene type monomers such as styrene, a substituted styrene (such as α-methylstyrene), and vinyltoluene; non-aromatic ring-containing (meth)acrylic acid esters such as a (meth) acrylic acid cycloalkyl ester (such as cyclohexyl (meth) acrylate or cyclopentyl di(meth)acrylate), bornyl (meth) acrylate, and isobornyl (meth)acrylate; aromatic ring-containing (meth)acrylic acid esters such as a (meth)acrylic acid aryl ester (such as phenyl (meth)acrylate), a (meth) acrylic acid aryloxyalkyl ester (such as phenoxyethyl (meth) acrylate), and a (meth)acrylic acid arylalkyl ester (such as benzyl (meth)acrylate); olefinic monomers such as ethylene, propylene, isoprene, butadiene and isobutylene; vinyl chloride, vinylidene chloride; isocyanate group-containing monomers such as 2-(meth)acryloyloxyethyl isocyanate; alkoxy group-containing monomers such as methoxyethyl (meth)acrylate and ethoxyethyl (meth)acrylate; vinyl ether type monomers such as methyl vinyl ether, and ethyl vinyl ether; and polyfunctional monomers such as 1,6-hexanediol di(meth)acrylate, ethylene glycol di(meth)acrylate, diethylene glycol di(meth)acrylate, triethylene glycol di(meth) acrylate, tetraethylene glycol di(meth)acrylate, (poly)ethylene glycol di(meth)acrylate, propylene glycol di(meth) acrylate, (poly)propylene glycol di(meth)acrylate, neopentyl glycol di(meth)acrylate, pentaerythritol di(meth)acrylate, trimethylolpropane tri(meth)acrylate, pentaerythritol tri (meth)acrylate, dipentaerythritol hexa(meth)acrylate, glycerin di(meth)acrylate, epoxy acrylate, polyester acrylate, urethane acrylate, divinylbenzene, butyl di(meth)acrylate, and hexyl di(meth)acrylate.

Examples of a rubber pressure-sensitive adhesive include those containing an elastomeric component such as natural rubber, a styrene-isoprene-styrene block copolymer (SIS block copolymer), a styrene-butadiene-styrene block copolymer (SBS block copolymer), a styrene-ethylene/butylene-styrene block copolymer (SEBS block copolymer), styrene-butadiene rubber, polybutadiene, polyisoprene, polyisobutylene, butyl rubber, chloroprene rubber, silicone rubber, acrylonitrile-butadiene rubber, ethylene-propylene terpolymer, and various combinations of such rubbers.

Silicone pressure sensitive adhesives may also be used. Silicone adhesives are, in general terms, blends of polydiorganosiloxanes (also referred to as silicone gums, typically having a number average molecular weight of about 5000 to about 10,000,000 Daltons (Da), preferably about 50,000 to about 1,000,000 Da) with copolymeric silicone resins (typically having a number average molecular weight of about 100 to about 1,000,000 Da, preferably about 500 to about 50,000 Da) comprising triorganosiloxy units and $SiO_{4/2}$ units. Preferably, silicone adhesives comprise from about 20 to about 60 parts by weight silicone gum and, correspondingly, from about 40 to about 80 parts by weight of a copolymeric silicone resin. It is beneficial, in terms of improving adhesive properties, to provide a chemical means of reacting the copolymeric silicone resin with the polydiorganosiloxane.

Blends of silicone pressure sensitive adhesives are also useful. Examples include blends of two different dimethylsiloxane-based pressure sensitive adhesives or blends of dimethylsiloxane-based pressure sensitive adhesives with dimethylsiloxane/diphenylsiloxane-based pressure sensitive adhesives.

Silicone pressure sensitive adhesives are also commercially available from a variety of manufacturers. Examples of commercially available silicone pressure sensitive adhesives include, those available from Dow Corning, under the trade designations 280A, 282, Q2-7406, and Q2-7566; those available from Momentive Performance Materials, Inc., under the trade designations SILGRIP PSA 590, PSA 600, PSA 595, PSA 610, PSA 518, PSA 6574 and PSA 529; and those available from Shin-Etsu, Akron, Ohio, under the trade designations KR-100P, KR-100, and KR-101-10.

The pressure-sensitive adhesive may also contain minor amounts of additives. Such additives may include, for example, a crosslinking agent, a cross bonding agent, a filler, a flame retardant, an antiaging agent, an antistatic, a softener, an ultraviolet absorber, an antioxidant, a plasticizer, a surfactant, and the like. The amount of additive(s) used can vary from 0.1 to 49 weight percent of the pressure sensitive adhesive material, depending on the end use desired.

The pressure-sensitive adhesive layer can be formed by any suitable method. For example, the PSA layer can be formed by coating a pressure-sensitive adhesive onto a surface of the reflective metal layer, followed by optional drying or curing, or the PSA layer can be formed by coating a pressure-sensitive adhesive on a support e.g., a release liner, followed by optional drying or curing to obtain a pressure-sensitive adhesive layer on the release liner, and then adhering the pressure-sensitive adhesive layer onto a surface of the reflective metal layer. For coating the pressure-sensitive adhesive composition, any suitable coating equipment can be used, such as a gravure roll coater, a reverse roll coater, a kiss roll coater, a dip roll coater, a bar coater, a knife coater, or a spray coater.

The tape 9 optionally comprises at least one removable release layer 7. The thickness of release layer 7 can be 5 to 150 micrometers, 10 to 125 micrometers, 20 to 100 micrometers, 40 to 85 micrometers, or 50 to 75 micrometers.

By "release layer" is meant any single or composite layer comprising a release coating, optionally supported by one or more additional layers including a release liner. A double-sided release layer is a composite layer comprising two outer release coatings separated by one or more additional layers. In one embodiment, the tape comprises double sided release layer. The double-sided release layer permits the entire tape, or sheet of tape material, be wound into a roll for use.

The release layer can be transparent or colored plastic material but is not limited thereto. Specifically, the release layer can comprise a support or "liner," for example, a paper or plastic based carrier or web material. For example, a specific liner is Kraft Paper, a specific intermediate coating is high-density polyethylene (HDPE). The release liner can, for example, comprise a material selected from the group consisting of polyethylene terephthalate (PET), polyethylene naphthalate (PEN) polyester polyamide, polycarbonate, ethylene vinyl acetate copolymer, ethylene-ethyl acrylate copolymer, ethylene-propylene copolymer, and polyvinylchloride. Specifically, a silicone resin or oligomer can be coated on PET or on polyolefin coated paper. The adhesive agent does not need to form a continuous or coherent layer on the release liner.

Specifically, the release layer can comprise a liner that is coated on one or two sides with a release agent, which provides a release effect against any type of a sticky material such as an adhesive. Release comprises separation of the liner from an adhesive material.

Various release layers are known in the art and, in one embodiment, can comprise a liner, an intermediate coating, and a release coating. An exemplary release layer is commercially available from Rexam Release, Bedford Park, Ill. under the trade name Rexam Grade 16043.

A release layer can optionally comprise an intermediate coating and a release coating on both faces of the liner, i.e., a first intermediate coating and a first release coating on one side of liner and a second intermediate coating and a second release coating on the other side of liner. This enables so-called differential release, in which a foam tape dispensed from a roll preferentially separates between the release coating in contact with one layer of tape and the first adhesive layer of the underlying layer of tape. Thus, a double-sided release layer comprises a release coating upon opposite sides. Specifically, the release coating can comprise a silicone polymer.

In one embodiment, the tape 9 has a release layer only on one side of the tape, which can be a double-sided release layer. Alternatively, the tape may have a double-sided release layer on both sides or may have a double-sided release layer on one side and a single-sided release layer on the other side.

The total thickness of the tape 9, including release layer 7, can be 20 μm to 600 μm, 25 μm to 500 μm, 30 μm to 400 μm, 35 μm to 350 μm, or 38 μm to 300 μm.

Figure 2:
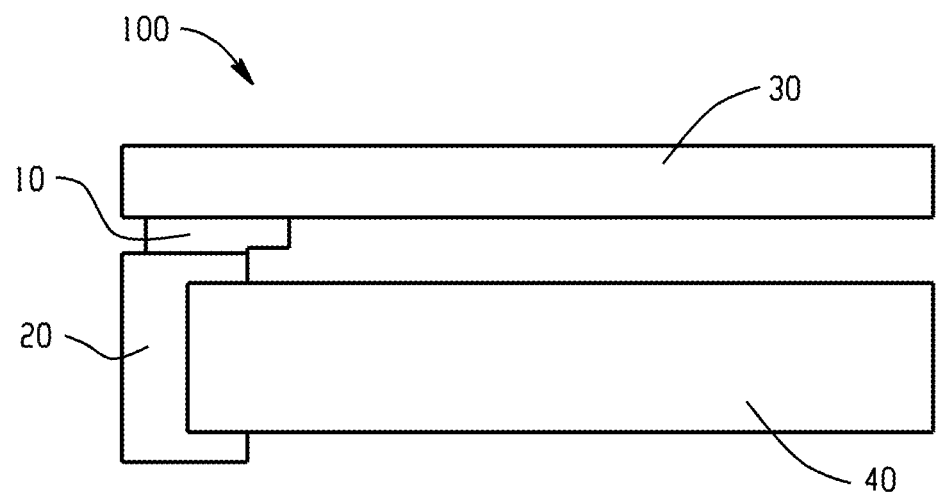
FIG. 2 is a cross-sectional illustration of an embodiment of a television display (100) in which a single-sided pressure-sensitive adhesive tape (20) is used to frame light guide panel (40), and the framed light guide panel is attached to the LCD panel (30) via a foam adhesive tape (10) bonding the LCD panel (30) and the framing single-sided pressure-sensitive adhesive tape (20).

The composition of the thermoplastic polymer layer is selected to provide adequate surface energy to be a good substrate for bonding to another material without requiring an intermediate treatment to achieve that surface energy. For example, as illustrated in FIG. 2, in manufacture of an LCD, after tape 20 is used to frame the light guide panel 40, the framed light guide panel 40 is then attached to the LCD panel 30 using a foam adhesive tape 10. In such an application, it is desirable for the outer surface of the tape frame, thermoplastic polymer layer 1, to have a surface energy of at least 40 milliNewtons per meter (mN/m), or at least 42 mN/m to be a good substrate for binding with foam adhesive tape 10. The thermoplastic polymer layer 1 should also be flexible enough to allow use of the resulting tape on a curved or uneven surface.

As used herein, the term "thermoplastic" refers to a material that is plastic or deformable, melts to a liquid when heated, and solidifies to a brittle, glassy state when cooled sufficiently. Examples of thermoplastic polymers that can be used include cyclic olefin polymers (including polynorbornenes and copolymers containing norbornenyl units, for example copolymers of a cyclic polymer such as norbornene and an acyclic olefin such as ethylene or propylene), fluoropolymers (e.g., polyvinyl fluoride (PVF), polyvinylidene fluoride (PVDF), fluorinated ethylene-propylene (FEP), polytetrafluoroethylene (PTFE), poly(ethylene-tetrafluoroethylene (PETFE), perfluoroalkoxy (PFA)), polyacetals (e.g., polyoxyethylene and polyoxymethylene), poly($C_{1-6}$ alkyl)acrylates, polyacrylamides (including unsubstituted and mono-N- and di-N-($C_{1-8}$ alkyl)acrylamides), polyacrylonitriles, polyamides (e.g., aliphatic polyamides, polyphthalamides, and polyaramides), polyamideimides, polyanhydrides, polyarylene ethers (e.g., polyphenylene ethers), polyarylene ether ketones (e.g., polyether ether ketones (PEEK) and polyether ketone ketones (PEKK)), polyarylene ketones, polyarylene sulfides (e.g., polyphenylene sulfides (PPS)), polyarylene sulfones (e.g., polyethersulfones (PES), polyphenylene sulfones (PPS), and the like), polybenzothiazoles, polybenzoxazoles, polybenzimidazoles, polycarbonates (including homopolycarbonates and polycarbonate copolymers such as polycarbonate-siloxanes, polycarbonate-esters, and polycarbonate-ester-siloxanes), polyesters (e.g., polyethylene terephthalates, polybutylene terephthalates, polyarylates, and polyester copolymers such as polyester-ethers), polyetherimides (including copolymers such as polyetherimide-siloxane copolymers), polyimides (including copolymers such as polyimide-siloxane copolymers), poly($C_{1-6}$ alkyl)methacrylates, polyalkylacrylamides (including unsubstituted and mono-N- and di-N-($C_{1-8}$ alkyl) acrylamides), polyolefins (e.g., polyethylenes, such as high density polyethylene (HDPE), low density polyethylene (LDPE), and linear low density polyethylene (LLDPE), polypropylenes, and their halogenated derivatives (such as polytetrafluoroethylenes), and their copolymers, for example ethylene-alpha-olefin copolymers, polyoxadiazoles, polyoxymethylenes, polyphthalides, polysilazanes, polysiloxanes (silicones), polystyrenes (including copolymers such as acrylonitrile-butadiene-styrene (ABS) and methyl methacrylate-butadiene-styrene (MBS)), polysulfides, polysulfonamides, polysulfonates, polysulfones, polythioesters, polytriazines, polyureas, polyurethanes, vinyl polymers (including polyvinyl alcohols, polyvinyl esters, polyvinyl ethers, polyvinyl halides (e.g., polyvinyl chloride), polyvinyl ketones, polyvinyl nitriles, and polyvinyl thioethers), or the like. A combination of the foregoing thermoplastic polymers can be used.

In certain embodiments, the thermoplastic polymer layer comprises polyurethane, polyethylene, polyester, or a combination thereof; preferably the thermoplastic polymer layer comprises polyurethane. The thermoplastic polymer layer comprising polyurethane can have a surface energy of 42 mN/m. The thermoplastic polymer layer can be obtained by any suitable method. For example, thermoplastic polymer layer can be cast on a removable support or release layer.

The thickness of the thermoplastic polymer layer can be for example, in the range of 1 to 150 μm, preferably in the range of 2 to 100 μm, and more preferably in the range of 4 to 75 μm.

The light-shielding layer disposed on a surface of the thermoplastic polymer layer may be any layer exhibiting light-shielding properties, i.e., having a low light transmittance. The light-shielding layer can be a black-colored layer or a white-colored layer and can be formed by any suitable method.

The light-shielding layer can comprise various materials exhibiting a light-shielding property, such as a pressure-sensitive adhesive composition, a resin composition, an ink composition, or a combination thereof. The light-shielding layer is preferably an ink layer, more preferably a printed layer.

In certain embodiments, the light-shielding layer is a black-colored layer. When the light-shielding layer is a black-colored layer, the layer will contain a black colorant.

When the light-shielding layer is an ink layer showing a black color, more particularly a printed layer showing a black color, the black-colored ink layer can be formed by a black-ink composition containing a black colorant.

Further, the light-shielding layer may be a resin layer showing a black color (black resin layer). When the light-shielding layer is a black resin layer, the black resin layer can be formed for example by a black-colored resin composition containing a black colorant.

The black colorant may be any suitable pigment or dye. Specific examples of the black colorant include carbon black (such as furnace black, channel black, acetylene black, thermal black or lamp black), graphite, copper oxide, manganese dioxide, aniline black, perylene black, titanium black, cyanine black, active charcoal, ferrite, magnetite, chromium oxide, iron oxide, molybdenum dioxide, chromium complex, a composite oxide type black dye, an anthraquinone type organic black dye, and combinations thereof.

A black printed layer can be formed by any suitable printing method using an ink composition. Ink compositions comprise, for instance, the coloring component (ink component), a binder resin, and a curing agent.

Examples of the coloring component used in a black printed layer include carbon black, acetylene black, graphite, iron oxide, copper oxide, aniline black, activated carbon, and combinations thereof. Examples of the binder resins include polyurethane resins, phenol resins, epoxy resins, acrylic resins, polyester resins, polyolefin resins, natural rubber, styrene-butadiene rubber, butadiene rubber, ethylene-propylene rubber, and combinations thereof. In some embodiments, polyurethane resin is preferred. Examples of the curing agent include isocyanate curing agent, epoxy curing agent, melamine curing agent, aziridine hardening agents, and combinations thereof. The ratio of each component in the ink composition may be determined as needed.

The thickness of the black printed layer can be 0.5 to 10 μm, 0.5 to 6 μm, 1 to 5 μm, or 2 to 4 μm.

Examples of a printing method to use with the ink composition include a gravure printing method, flexographic printing method, offset printing method, relief printing method, a screen printing method, stencil printing method, letterpress printing method, and the like.

The laminating can entail laminating the surface of the light-shielding layer opposite to the surface contacting the thermoplastic polymer layer to the surface of the substrate opposite to the reflective metal layer to form a layered structure, with an optional intermediate layer between the substrate and the light-shielding layer of the two stacks of layers. The light-shielding layer can be in direct contact with the substrate, without the intermediate layer. Alternatively, an intermediate layer can be present. The intermediate layer can be a dried layer of a suitable liquid adhesive coated on the substrate surface opposite to the reflective metal layer or on the surface of the light-shielding layer opposite to the thermoplastic polymer layer. The thickness of the adhesive layer, when present, can be 0.5 to 10 micrometers, 1 to 8 micrometers, or 3 to 7 micrometers. Suitable liquid adhesives include acrylic adhesives. The layered structure can then be placed in a press, e.g., a vacuum press, under a pressure and temperature and for duration of time suitable to bond the layers and form a laminate. Lamination and optional curing can be by a one-step process, for example, using a vacuum press, or can be by a multi-step process. In a one-step process, the layered structure can be placed in a nip roller system, with a laminating pressure, e.g., 50 to 150 pounds per square inch (psi) (345 to 1034 kiloPascals (kPa), or 60 to 100 psi (414 to 689 kPa) and a laminating temperature of, e.g., 60 to 140 degrees Celsius (° C.), or 80° C. to 120° C. using nip rollers heated to, for example, 50 to 70° C., or 55 to 65° C., or 60° C.

After dry lamination to obtain a multilayer stack comprising layers 1-5, illustrated in FIG. 1, the PSA layer 6 with optional release layer 7 can be formed on the surface of the reflective metal layer by any suitable method, as discussed above, to obtain the disclosed multilayer single-sided adhesive tape 9.

After removing optional release layer 7, if present, from tape 9 of FIG. 1, the pressure-sensitive adhesive layer 6 of the tape can be adhered directly with at least a portion of the perimeter of a light guide panel 40, as illustrated schematically in FIG. 2, to form a frame for light guide panel 40.

The single-sided pressure-sensitive adhesive tape is useful as a light-reflective/light shielding pressure-sensitive adhesive tape for use in framing a light guide panel of a liquid crystal display apparatus (LCD), particularly a low-bezel compact liquid crystal display apparatus, such as those employed, for example, in premium televisions and mobile phones.

Articles comprising the single-sided pressure-sensitive adhesive tape are also disclosed. Exemplary articles include a light guide panel, a liquid crystal display, a television, a mobile phone, a computer monitor, or a tablet. In certain embodiments, the article is a low-bezel article.

A method of manufacturing a light guide panel for a liquid crystal display is also disclosed. The method includes adhering the single-sided pressure-sensitive adhesive layer of the tape disclosed herein to at least a portion of the perimeter of a light guide panel to form a frame. The method can further comprise removing the release layer from the single-sided pressure-sensitive adhesive tape or attaching the light guide panel to a liquid crystal display. After attachment of the tape to the light guide panel, the thermoplastic polymer layer is not in direct contact with the liquid crystal display panel.

The disclosed single-sided pressure-sensitive adhesive tape has the unexpected advantage of superior light-shielding performance (transmittance at 550 nm of 0.1% or less) coupled with superior reflectance of 80% or higher at 550 nm. These properties make the tape particularly advantageous as a framing material for light guide panels of low- or no-bezel liquid crystal displays. Further, in such applications, the exposed surface of the tape has a sufficiently high surface energy (≥40 mN/m) that no pre-treatment of the tape surface is required prior to bonding to the LCD panel via a foam tape, saving time and costs in production of the display module.

The following examples are provided to illustrate the present disclosure. The examples are merely illustrative and are not intended to limit devices made in accordance with the disclosure to the materials, conditions, or process parameters set forth therein.

EXAMPLES

Light transmittance and reflectance of a tape were determined by the following test method. A 50 mm square test sample of the multilayer tape is placed on a spectrophotometer to determine the transmittance and reflectance of the sample every 10 nm over a wavelength range of 360 to 740 nm. The spectrophotometer was a CM-5/KONICA MINOLTA (Japan), equipped with a Xenon lamp as light source, using a viewing angle of 10°. Three different runs were performed on each sample.

Surface energy is measured in accordance with ASTM D-2578.

Example 1: Single-Sided Pressure-Sensitive Adhesive Tape

A multi-layer single-sided pressure-sensitive adhesive tape, as represented by FIG. 1, was prepared.

A layer of aluminum was deposited on one surface of a 12 μm thick substrate of polyethylene terephthalate by electron-beam evaporation to a thickness of 20 nm. A black coating comprising 10 wt % carbon black and 10 wt % polyurethane resin was deposited on a surface of a thermoplastic polyurethane layer by MICROGRAVURE coating to a thickness of 3 μm. The substrate surface opposite the aluminum layer and the black coated surface of the thermoplastic polyurethane layer (20 μm thickness) are dry laminated together using a 5 μm layer of acrylic adhesive. After the dry lamination is completed, a surface of a 30 μm thick layer of acrylic pressure-sensitive adhesive layer having a 50 μm release layer on the opposite surface is adhered to the aluminum surface opposite the polyethylene terephthalate substrate.

Average transmittance and reflectance values of the tape at 550 nm and the measured surface energy are shown in Table 1.

TABLE 1

| Tape Properties | |
|---|---|
| Light Transmittance | 0.00% (at 550 nm) |
| Reflectance | 83.2% (at 550 nm) standard deviation = 0.02 |
| Surface energy | 42 mN/m |

Example 2: Single-Sided Pressure-Sensitive Adhesive Tape as Light Guide Panel Frame The single-sided pressure-sensitive adhesive tape made in general accordance with Example 1 is adhered to the perimeter of a light guide panel and attached to an LCD panel, as depicted schematically in FIG. 2.

Set forth below are various non-limiting aspects of the disclosure.

Aspect 1: A single-sided pressure-sensitive adhesive tape comprises a substrate, a reflective metal layer disposed on a surface of the substrate, and a pressure-sensitive adhesive layer disposed on the reflective metal layer; a thermoplastic polymer layer, and a light-shielding layer disposed on a surface of the thermoplastic polymer layer; wherein the light-shielding layer is dry laminated to the surface of the substrate opposite the surface on which the reflective metal layer is disposed.

Aspect 2: The tape of claim 1, wherein the substrate is polyethylene terephthalate, polyethylene naphthalate, polymethylmethacrylate, or a combination thereof.

Aspect 3: The tape of claim 1 or 2, wherein the pressure-sensitive adhesive is an acrylic adhesive, a rubber adhesive, a silicone adhesive, a urethane adhesive, or a combination thereof.

Aspect 4: The tape of any one of claims 1 to 3, wherein the reflective metal layer is aluminum, silver, copper, platinum, nickel, or a combination thereof.

Aspect 5: The tape of any one of claims 1 to 4, wherein the reflective metal layer is deposited by physical vapor deposition, sputtering, thermal evaporation, chemical vapor deposition, or a combination thereof.

Aspect 6: The tape of any one of claims 1 to 5, wherein the reflective metal layer has a thickness of 1 nanometer to 100 nanometers.

Aspect 7: The tape of any one of claims 1 to 6, wherein the light-shielding layer comprises a black coating or a white coating.

Aspect 8: The tape of any one of claims 1 to 7, wherein the thermoplastic polymer layer comprises polyurethane, polyethylene, polyester, or a combination thereof; preferably the thermoplastic polymer layer comprises polyurethane.

Aspect 9: The tape of any one of claims 1 to 8, further comprising a removable release layer disposed on the pressure-sensitive adhesive layer.

Aspect 10: The tape of any one of claims 1 to 9, wherein the pressure-sensitive adhesive layer is in direct contact with at least a portion of the perimeter of a light guide panel.

Aspect 11: The tape of any one of claims 1 to 10, wherein the tape has a transmittance of 0.1% or lower; and/or a reflectance of at least one surface of 80% or higher.

Aspect 12: An article comprising the tape of any one of claims 1 to 11.

Aspect 13: The article of claim 12 which is a light guide panel, a liquid crystal display, a television, a mobile phone, a computer monitor, or a tablet.

Aspect 14: The article of claim 12 or 13, wherein the article is a low-bezel article.

Aspect 15: A method of manufacturing a light guide panel for a liquid crystal display, comprising adhering the single-sided pressure-sensitive adhesive layer of the tape of any one of claims 1 to 11 to at least a portion of the perimeter of a light guide panel to form a frame.

Aspect 16: The method of claim 15, further comprising attaching the light guide panel to a liquid crystal display or removing the release layer from the single-sided pressure-sensitive adhesive tape.

Aspect 17: The method of claim 16, wherein after attachment the thermoplastic polymer layer is not in direct contact with the liquid crystal display.

Aspect 18: The method of any one of claims 15 to 17, wherein the thermoplastic polymer layer comprises polyurethane.

The compositions, methods, and articles can alternatively comprise, consist of, or consist essentially of, any appropriate materials, steps, or components herein disclosed. The compositions, methods, and articles can additionally, or alternatively, be formulated so as to be devoid, or substantially free, of any materials (or species), steps, or components, that are otherwise not necessary to the achievement of the function or objectives of the compositions, methods, and articles.

The terms "a" and "an" do not denote a limitation of quantity, but rather denote the presence of at least one of the referenced item. The term "or" means "and/or" unless clearly indicated otherwise by context. Reference throughout the specification to "an aspect," "an embodiment," "another embodiment," "some embodiments," and so forth, means that a particular element (e.g., feature, structure, step, or characteristic) described in connection with the embodiment is included in at least one embodiment described herein, and may or may not be present in other embodiments. In addition, it is to be understood that the described elements may be combined in any suitable manner in the various embodiments.

When an element such as a layer, film, region, or substrate is referred to as being "on" another element, it can be directly on the other element or intervening elements may also be present. In contrast, when an element is referred to as being "directly on" another element, there are no intervening elements present.

Unless specified to the contrary herein, all test standards are the most recent standard in effect as of the filing date of this application, or, if priority is claimed, the filing date of the earliest priority application in which the test standard appears.

The endpoints of all ranges directed to the same component or property are inclusive of the endpoints, are independently combinable, and include all intermediate points and ranges. For example, ranges of "up to 25 wt %, or 5 to 20 wt %" is inclusive of the endpoints and all intermediate values of the ranges of "5 to 25 wt %," such as 10 to 23 wt %, etc.

The term "combination" is inclusive of blends, mixtures, alloys, reaction products, and the like. Also, "at least one of"

means that the list is inclusive of each element individually, as well as combinations of two or more elements of the list, and combinations of at least one element of the list with like elements not named. In a list of alternatively useable species, "a combination thereof" means that the combination can include a combination of at least one element of the list with one or more like elements not named.

Unless defined otherwise, technical and scientific terms used herein have the same meaning as is commonly understood by one of skill in the art to which this invention belongs.

All cited patents, patent applications, and other references are incorporated herein by reference in their entirety. However, if a term in the present application contradicts or conflicts with a term in the incorporated reference, the term from the present application takes precedence over the conflicting term from the incorporated reference.

While particular embodiments have been described, alternatives, modifications, variations, improvements, and substantial equivalents that are or may be presently unforeseen may arise to applicants or others skilled in the art. Accordingly, the appended claims as filed and as they may be amended are intended to embrace all such alternatives, modifications variations, improvements, and substantial equivalents.

What is claimed is:

1. A single-sided pressure-sensitive adhesive tape comprising
    a substrate,
    a reflective metal layer disposed on a surface of the substrate,
    a pressure-sensitive adhesive layer disposed on the reflective metal layer,
    a thermoplastic polymer outer layer, and
    a light-shielding layer disposed on a surface of the thermoplastic polymer layer;
    wherein the light-shielding layer is dry laminated to the surface of the substrate opposite the surface on which the reflective metal layer is disposed, and
    wherein the thermoplastic polymer layer comprises polyurethane.

2. The tape of claim 1, wherein the substrate is polyethylene terephthalate, polyethylene naphthalate, polymethylmethacrylate, or a combination thereof.

3. The tape of claim 1, wherein the pressure-sensitive adhesive is an acrylic adhesive, a rubber adhesive, a silicone adhesive, a urethane adhesive, or a combination thereof.

4. The tape of claim 1, wherein the reflective metal layer is aluminum, silver, copper, platinum, nickel, or a combination thereof.

5. The tape of claim 1, wherein the reflective metal layer is deposited by physical vapor deposition, sputtering, thermal evaporation, chemical vapor deposition, or a combination thereof.

6. The tape of claim 1, wherein the reflective metal layer has a thickness of 1 nanometer to 100 nanometers.

7. The tape of claim 1, wherein the light-shielding layer comprises a black coating or a white coating.

8. The tape of claim 1, further comprising a removable release layer disposed on the pressure-sensitive adhesive layer.

9. The tape of claim 1, wherein the pressure-sensitive adhesive layer is in direct contact with at least a portion of the perimeter of a light guide panel.

10. The tape of claim 1, wherein the tape has a transmittance of 0.1% or lower; and/or
    a reflectance of at least one surface of 80% or higher.

11. The tape of claim 1, wherein the thermoplastic polymer layer comprising polyurethane has a surface energy of at least 40 milliNewtons per meter.

12. The tape of claim 1, wherein the thermoplastic polymer layer comprising polyurethane has a surface energy of at least 42 milliNewtons per meter.

13. An article comprising the tape of claim 1.

14. The article of claim 13 which is a light guide panel, a liquid crystal display, a television, a mobile phone, a computer monitor, or a tablet.

15. The article of claim 13, wherein the article is a low-bezel article.

16. A method of manufacturing a light guide panel for a liquid crystal display, comprising
    adhering the single-sided pressure-sensitive adhesive layer of the tape of claim 1 to at least a portion of the perimeter of a light guide panel to form a frame.

17. The method of claim 16, further comprising
    attaching the light guide panel to a liquid crystal display, or
    removing the release layer from the single-sided pressure-sensitive adhesive tape.

18. The method of claim 17, wherein after attachment the thermoplastic polymer layer is not in direct contact with the liquid crystal display.

* * * * *